US 12,430,652 B2

(12) United States Patent
Lakka (10) Patent No.: US 12,430,652 B2
(45) Date of Patent: Sep. 30, 2025

(54) SYSTEMS AND METHODS FOR USE IN FACILITATING NETWORK TRANSACTIONS

(71) Applicant: MASTERCARD INTERNATIONAL INCORPORATED, Purchase, NY (US)

(72) Inventor: Sowmya Reddy Lakka, Wildwood, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 138 days.

(21) Appl. No.: 17/373,027

(22) Filed: Jul. 12, 2021

(65) Prior Publication Data
US 2022/0012738 A1    Jan. 13, 2022

Related U.S. Application Data

(60) Provisional application No. 63/051,174, filed on Jul. 13, 2020.

(51) Int. Cl.
*G06Q 20/40* (2012.01)
*G06Q 20/10* (2012.01)

(52) U.S. Cl.
CPC ......... *G06Q 20/405* (2013.01); *G06Q 20/102* (2013.01); *G06Q 20/108* (2013.01); *G06Q 20/401* (2013.01)

(58) Field of Classification Search
CPC .. G06Q 20/405; G06Q 20/102; G06Q 20/108; G06Q 20/401
See application file for complete search history.

(56) References Cited

U.S. PATENT DOCUMENTS

| | | | |
|---|---|---|---|
| 10,769,659 B2* | 9/2020 | Kohli | G06Q 30/0253 |
| 2010/0223165 A1* | 9/2010 | Calman | G06Q 40/02 |
| | | | 709/204 |
| 2017/0221066 A1* | 8/2017 | Ledford | G06Q 20/4016 |
| 2019/0043026 A1* | 2/2019 | Solis | G06Q 20/40 |

FOREIGN PATENT DOCUMENTS

WO    WO-2018005635 A2 *    1/2018    ........... G06Q 20/227

* cited by examiner

*Primary Examiner* — Neha Patel
*Assistant Examiner* — Davida Lee King (57) ABSTRACT

Systems and methods are provided for facilitating network transactions. One exemplary method includes receiving a request from a transaction originator for a transaction between a sending party and a receiving party directing funds from an account of the sending party to an account of the receiving party, and transmitting the request to an interface processor, via a message gateway, thereby enabling the interface processor to transmit an authorization request for the transaction to a banking institution associated with the sending party's account via a payment network. The method also includes determining a status of the transaction from authorization data received from the payment network, but not received from the message gateway, and providing the status to the transaction originator, thereby bypassing the message gateway and limiting an unknown status for the transaction being provided to the transaction originator in case of a disruption in communication from the message gateway.

17 Claims, 3 Drawing Sheets

FIG. 3

SYSTEMS AND METHODS FOR USE IN FACILITATING NETWORK TRANSACTIONS

CROSS-REFERENCE TO RELATED APPLICATION

This application claims the benefit of, and priority to, U.S. Provisional Application No. 63/051,174, filed Jul. 13, 2020. The entire disclosure of the above application is incorporated herein by reference.

FIELD

The present disclosure generally relates to systems and methods for use in facilitating network transactions, and in particular, to systems and methods for providing statuses associated with the network transaction through alternate routes.

BACKGROUND

This section provides background information related to the present disclosure which is not necessarily prior art.

Entities are known to transfer funds through network transactions. In one example, the transactions may involve different accounts, whereby, for example, users transfer funds from their accounts to accounts associated with merchants in exchange for products or services (e.g., consumer (or person) to merchant (or P2M) transactions, etc.) or users transfer funds from their accounts to accounts of other users (e.g., via person-to-person (or P2P) transactions, etc.). In another example, the transactions may involve users providing payment cards associated with their accounts to merchants to purchase products or services, whereby funds are provided to the merchants for the products or services. In the above examples, when the accounts include payment accounts, the payment account transactions are generally processed through a payment network, which manages authorization, clearing and settlement of the transactions. As part thereof, transaction messages (e.g., authorization requests, authorization replies, etc.) are passed to/from different banking institutions associated with the particular payment accounts involved in the transactions.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment transactions may be initiated by senders (e.g., individual users, merchants, other businesses, etc.), whereby funds are transferred from accounts associated with the senders to other accounts associated with recipients of the funds. In addition, payment transactions in the form of purchase transactions may be initiated to purchase products or services, in return for funds being transferred from accounts of senders (e.g., payer accounts, etc.) to accounts of recipients (e.g., payees accounts, etc.). As an example, when a typical payment transaction or purchase transaction is initiated by an individual user (e.g., a consumer, etc.) at a merchant (as a P2M transaction), (e.g., in person at a point-of-sale (POS) terminal associated with the merchant, by scanning a code (e.g., a QR code, etc.) associated with a product, remotely by entering a USSD code or IVR code into a corresponding application, etc.), the merchant generates an authorization request for the transaction, in a form consistent with the ISO 8583 standard, and transmits the same to an acquirer, which passes the request on to an issuer (associated with a payment account of the user initiating the transaction) via a payment network. An authorization reply is then compiled by the issuer, again in a form consistent with the ISO 8583 format, and directly provided back to the merchant (whereby the transaction is either approved or declined). Since the communications in this example generally directly involve each of the involved parties, interruptions in such communications are generally not a concern.

Alternatively, though, in some instances a payment transaction may be initiated by the individual user at the merchant through a third party (e.g., through Mastercard® Send, etc.), via a transaction originator (e.g., a virtual wallet provider, etc.) where the third party initiator, in turn, interacts with an originating banking institution on behalf of the transaction originator (or more particularly an interface processor associated with the originating banking institution). While the originating banking institution may communicate with the payment network in a designated format for the payment network (e.g., the ISO 8583 format, JSON format, XML format, etc.), the third party initiator will often interact with the originating banking institution in a different manner (e.g., via one or more web services, application programming interfaces (APIs), etc.) and/or in a different format (e.g., in a format other than the ISO 8583 format, etc.). In this example, disruptions in the interactions between the third party initiator and the originating banking institution may occur, whereby a status of the underlying transaction may be lost, unknown or indeterminate, and whereby the third party initiator and/or the transaction originator may then be unable to determine whether the transaction is approved, declined or otherwise. This uncertainty about the transaction may persist for hours or for more than a day, which is problematic, especially for face-to-face transactions. The same may be true for payment transactions between different individual users (e.g., person-to-person (P2P) transactions, etc.) and payment transactions from a business (or merchant) to an individual user (e.g., business-to-consumer (B2C) transactions, etc.), in which a third party initiator is similarly involved in facilitating the transaction(s).

With that said, in payment transactions involving a third party initiator, the systems and methods herein uniquely permit statuses of the transactions to be separately acquired from the payment network involved in processing the transactions, as an alternative to acquiring such statuses directly through the originating banking institution(s). In particular, the third party initiator is permitted to bypass a message gateway used to interact with the originating banking institution(s) and interact directly with the payment network (e.g., via an API call, etc.), whereupon the payment network provides a feed of authorization data for its own processing that can be used (e.g., by a host associated with the payment network, etc.) to provide statuses of the transactions to the third party initiator. In this manner, and as at least one practical application of the present disclosure, disruptions between the third party initiator and the originating banking institution(s) (e.g., at the message gateway, etc.) may be tolerated without diminishing reporting of transaction statuses to the transaction originators involved in the transactions.

Figure 1:
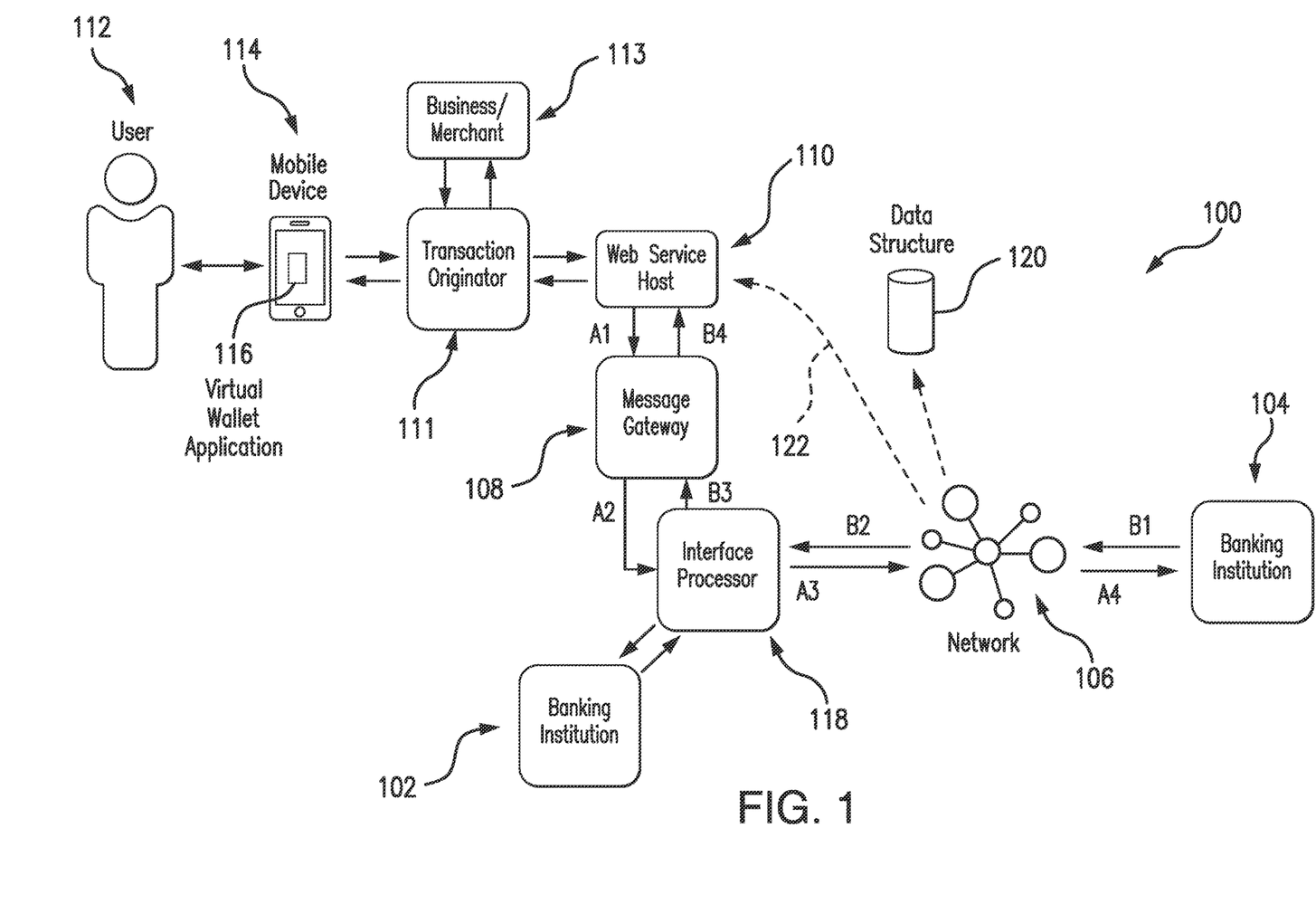
FIG. 1 is an exemplary system of the present disclosure suitable for use in facilitating network transactions when, for example, communication between parties involved in the transactions is interrupted.

FIG. 1 illustrates an exemplary system 100, in which one or more aspects of the present disclosure may be implemented. Although the system 100 is presented in one arrangement in FIG. 1, other embodiments may include systems arranged otherwise depending, for example, on a manner in which payment transactions are initiated, a manner in which wireless communications are facilitated, etc.

In the illustrated embodiment, the system 100 generally includes first and second banking institutions 102 and 104, a payment network 106, a message gateway 108, a web service host 110, and a transaction originator 111, each coupled to (and in communication with) one or more networks. The one or more networks are represented in FIG. 1 by the arrowed lines and each may include, without limitation, a local area network (LAN), a wide area network (WAN) (e.g., the Internet, etc.), a mobile network, and/or another suitable public and/or private network capable of supporting communication among two or more of the parts illustrated in FIG. 1, or any combination thereof. For example, one or more of the networks may include multiple different networks, such as a private payment transaction network made accessible by the payment network 106 to the banking institutions 102 and 104 and the message gateway 108 and, separately, the public Internet, which is accessible as desired to the message gateway 108, the web service host 110, the transaction originator 111, and/or one or more devices associated with users in the system 100 (e.g., user 112, etc.), etc.

The first banking institution 102 in the system 100 may be associated with a merchant or a person (e.g., the user 112, business/merchant 113, etc.) (and more broadly, with the transaction originator 111) and is configured as a financial institution. In this manner, the first banking institution 102 generally sponsors the transaction originator 111 in connection with facilitating purchase or payment transactions as described herein.

The second banking institution 104 in the illustrated embodiment is associated with a merchant or a person (not shown) and is configured, in this example, to issue one or more accounts (e.g., payment accounts, etc.) for the merchant or the person receiving the funds. The funding accounts may include, without limitation, card accounts, direct deposit accounts, mobile money wallet accounts, etc. And, the payment accounts may include, without limitation, payment accounts such as credit accounts, debit accounts, savings accounts, etc. While the system 100 is generally described herein with the user 112 initiating the transaction(s) (via the transaction originator 111 (e.g., a wallet provider associated with a virtual wallet of the user 112, etc.)) with a merchant or another user, it should be appreciated that in other implementations of the system 100 businesses (or business entities such as the business/merchant 113, etc.) may similarly initiate transactions herein via the transaction originator 111 with other businesses/merchants or with the user 112 (or other users) in a similar manner.

Each of the banking institutions 102 and 104 (and other banking institutions potentially associated with the system 100) are coupled to and/or are in communication with the payment network 106, whereby the payment network 106 is configured to facilitate transactions (broadly, network transactions) funded by an account (e.g., a payment account, another account, etc.) of the user 112 (or other entity), for example, issued by the first banking institution 102 (as an originating banking institution) (or another financial institution), to an account (e.g., a payment account, another account, etc.) issued by the second banking institution 104 (as a receiving banking institution) (e.g., to a merchant, another person, another business entity, etc.). The payment network 106 is thus configured to facilitate authorization of the transactions, and later, clearing and settlement of the transactions. Together, the banking institutions 102 and 104 and the payment network 106 are consistent with the conventional payment account transaction platform, which is generally referred to as the four-party transaction platform (e.g., where the fourth party includes a merchant, etc.).

The payment network 106 in the system 100, as well as the banking institutions 102 and 104, are configured to receive and transmit messages (e.g., authorization messages, etc.) (broadly, interchange messages or network messages) in a specific format, such as, for example, a format consistent with the ISO 8583 standard, the ISO 20022 standard, etc. In general, the specific format of the messaging ensures that the banking institutions 102 and 104 and the payment network 106 understand the particular request being made via the messages and the details of the request (e.g., which data corresponds to which data elements (DE) of the messaging, etc.). In connection therewith, the messaging is consistent with the specific format being used and includes a message type indicator, for example, that is a four-digit numeric field which indicates the overall functions of the messages.

In addition in the illustrated system 100, the user 112 is further associated with a mobile device 114, which in the illustrated embodiment generally includes a portable communication device such as a card, a smartphone, a tablet, a laptop, etc. And, in the illustrated embodiment, the mobile device 114 includes a virtual wallet application 116 (as associated with the virtual wallet provider (or transaction originator 111 in this example), etc.). The virtual wallet application 116 includes executable instructions, stored in a non-transitory storage media within the mobile device 114, which cause the mobile device 114 to perform one or more of the various operations described herein. In various embodiments, the virtual wallet application 116 may include, for example, PayPass® from MasterCard®, Apple Pay® from Apple®, PayWave® from Visa®, etc., or other suitable application offered by one of the banking institutions 102 or 104, or by the payment network 106, or by other entities, etc. While the mobile device 114 is illustrated as a mobile phone in FIG. 1, it should again be appreciated (as indicated above) that the device 114 may be otherwise, for example, a card device, a tablet, a laptop, etc.

In such embodiments of the present disclosure where the virtual wallet application 116 is installed in the mobile device 114 and provisioned with one or more credentials associated with a payment account issued to the user 112 (e.g., by the first banking institution 102, by another financial institution associated with the user 112, by a wallet program enabler, etc.), the user 112 is permitted to initiate one or more transactions from the virtual wallet application 116 to a merchant or another user/consumer (e.g., push payment transactions, other transactions, etc.). For example, the virtual wallet application 116 may be configured to facilitate transactions between the user 112 and a different consumer (e.g., a P2P transaction, etc.) and/or it may be configured to facilitate transactions between the user 112 and a merchant (e.g., a P2M transaction, etc.). Further, in some embodiments, the virtual wallet application 116 may be configured to receive transfers of funds from other users and/or businesses to the user 112 (e.g., a B2C transaction, etc.). In any case, the one or more credentials provisioned to the virtual wallet application 116 may include, without limitation, a primary account number (PAN), an expiration date, and/or a token, etc. associated with the user's payment account. When a transaction is initiated by the user 112 to another user/consumer or business, the mobile device 114, as configured by the virtual wallet application 116, interacts with the transaction originator 111 whereby the transaction originator 111 transmits a transaction request to the web service host 110 (e.g., via an API call (HTTPs), etc.).

It should be appreciated that the present disclosure is not limited to such transactions from the virtual wallet application 116 (e.g., as transactions not involving wallet applications may be implemented via the present disclosure as well, etc.), nor is it limited to transactions processed through the payment network 106 (or payment networks in general). For example, the present disclosure is also applicable to transactions facilitated by and/or processed by non-card networks, as well as transactions involving payments to bank accounts, mobile wallets (e.g., a payment to the user 112 (here, as a receiving party) via his/her virtual wallet application 116, etc.), etc. Further, it should be appreciated that the user 112 (or senders or sending parties in general) may not need the mobile device 114 and/or the virtual wallet application 116 at all to facilitate the transactions and interactions described herein. For instance, the user 112 may participate in a transaction without use of the mobile device 114 or the virtual wallet application 116, whereby a user or business may have the user's account (or card) on file for use in facilitating a transaction to the user 112. It should also be appreciated, again, that senders of funds herein may include individual users (such as the user 112) as well as businesses or merchants (such as business/merchant 113), etc.

With continued reference to FIG. 1, the web service host 110 may include a service such as the Mastercard Send® service. In connection therewith, the web service host 110 may be configured to provide one or more APIs (e.g., a REST API over HTTPs (TCP), etc.), accessible by the transaction originator 111, to facilitate the various transactions described herein (e.g., authorizations for purchase; fund transfers; payment interactions including P2P transactions, B2C transactions, P2M transactions, cross-border transactions, etc.; etc.). That said, the web service host 110 is generally an on-behalf service for acquiring banks, processors, sponsor banks, etc. (e.g., the banking institution 102, etc.) that, in one sense, simplifies payments to recipient accounts. For instance, the web service host 110 may provide services for acquirers (e.g., the first banking institution 102, the second banking institution, 104, etc.) to enable transaction originators (e.g., the transaction originator 111, etc.) to initiate transactions to recipients. In so doing, the web service host 110 is configured to: determine to which payment network (e.g., payment network 106, etc.) and to which transaction type to route the transaction, provide reporting to the transaction originators and acquirers, reconcile the transactions, and facilitate clearing.

In addition, the transaction originator 111 may include a financial institution (e.g., a virtual wallet provider, etc.) or a non-financial institution (e.g., a merchant or business, etc.) that is configured to originate transactions, from senders, to recipients. In connection therewith, the transaction originator 111 is associated with a sponsor bank or acquirer (e.g., the first banking institution 102 in the illustrated embodiment, etc.) to facilitate settlement of the transactions. As such, in the illustrated embodiment, when the web service host 110 initiates a transaction requested by the transaction originator 111 (e.g., with regard to the user 112, the business/merchant 113, etc.), it is submitted to the payment network 106 on behalf of the first banking institution 102. The first banking institution 102 holds the account for the transaction originator 111 (e.g., the user 112, etc.) and provides settlement services to the payment network 106. With that said, while the transaction originator 111 is illustrated in connection with the user 112 in FIG. 1, it should be appreciated that this is not required in all embodiments, whereby in some embodiments, the transaction originator 111 may originate transactions for merchants, etc.

In one exemplary embodiment, for a P2P transaction between the user 112 (as a sending party) and a recipient user (as a receiving party), the web service host 110 is configured to receive the transaction request (for the given P2P push transaction) from the transaction originator 111 (e.g., the mobile device 114 may include an application (e.g., the virtual wallet application 116, another application, etc.) that interfaces with the transaction originator 111 (i.e., in this example the virtual wallet provider associated with the virtual wallet application 116), etc.), for example, and transmit (at A1) a transaction request (either the same as the request received from the transaction originator 111 or as a request including at least some of the data received from the transaction originator 111) to the message gateway 108 (e.g., Banknet Connect, etc.). Further, in this exemplary embodiment, the message gateway 108 is not a merchant (and is not a point-of-sale (POS) device associated with a merchant). Rather, the message gateway 108 is associated with the web service host 110, whereby the web service host 110 is permitted to initiate transactions managed by the payment network 106. Upon receipt of the transaction request from the web service host 110, the message gateway 108 is configured to forward (at A2) the transaction request to an interface processor 118 (e.g., the Mastercard® Interface Processor (MIP), etc.) associated with the first banking institution 102 (associated with the funding account of the user 112). The interface processor 118, then, is configured to compile an authorization request for the transaction (consistent with the specific format of the request received from the web service host 110) (or upon converting the request received from the web service host 110 to a format consistent with that of the payment network 106) (broadly, an authorization message or network message). In connection therewith, the first banking institution 102 may determine (now or at a later time) whether the user's account is in good standing and whether there are sufficient funds and/or credit to fund the transaction. In addition, the first banking institution 102 may receive reports (now or later) from the payment network 106 and/or the web service host 110 to get insight as to which transactions were run and, subsequently, to support settlement.

Next, the interface processor 118 is configured to transmit (at A3) the authorization request to the payment network 106, such as, for example, to a network operated by VISA®, Discover®, American Express®, or Mastercard® (i.e., Mastercard International Incorporated, which is the assignee hereof) (e.g., Banknet, the Mastercard® Debit Switch, etc.), etc. (where such network, broadly, may be referred to as a payment network)). The payment network 106 is configured to then transmit (at A4) the authorization request to the second banking institution 104 (or to an interface processor associated therewith). If the transaction is approved (e.g., by the second banking institution 104, etc.), an authorization reply (broadly, an authorization message or network message), or response (indicating the approval or decline of the transaction), is generated and transmitted back from the second banking institution 104 to the payment network 106 (at B1), and then further transmitted by the payment network 106 (at B2) to the interface processor 118 associated with the first banking institution 102. The interface processor 118, then, is configured to transmit (at B3) the authorization reply, from the second banking institution 104, to the message gateway 108.

Then in the system 100, in response to receipt of the authorization reply (at B3), the message gateway 108 is configured to determine a status of the transaction (e.g., approved, declined, etc.), and compile and transmit (at B4) a message including the status to the web service host 110. The web service host 110, in turn, is configured to inform the transaction originator 111 of the status. Specifically, for example, in the P2P transaction of this exemplary embodiment, in response to the web service host 110 informing the transaction originator 111 of the status, the transaction originator 111 may be configured to then report the status back to the mobile device 114, whereupon the mobile device 114, as configured by the virtual wallet application 116, displays the status to the user 112. When the transaction is approved, the transaction and other transactions are later cleared and/or settled (via appropriate transaction messages such as clearing messages and/or settlement messages, for example) by and between the banking institutions 102 and 104 (by appropriate agreements) (and the accounts issued thereby). What's more, in various embodiments, the second banking institution 104 may be configured to inform the recipient user (not shown) of the status of the transaction (although the web service host 110 may also be configured to do so in some embodiments as well).

With that said, as the authorization reply is received by the payment network 106 (at B1) (e.g., both dual message and single message authorizations, etc.), the payment network 106 may be configured to generate a log of the messaging, and also, the content of the messaging, and to store the log in data structure 120 (broadly, as authorization data). As indicated by the dotted line in FIG. 1, the data structure 120 includes a memory and/or a computing device, which is included or integrated, at least in part, with the payment network 106. It should be appreciated that the data structure 120 and the log therein may be included and/or integrated with other parts of the system 100 (including in the web service host 110) in other embodiments. The payment network 106 may then be configured to selectively publish the log, as a feed 122, for example, to the web service host 110 (whereby the feed 122 is received by the web service host 110 in a manner not through the message gateway 108 and whereby the feed 122 includes data not received from the message gateway 108).

The log generated (and published) by the payment network 106 for the various messaging received thereby includes an entry for each transaction and/or each message (e.g., each authorization request message and/or each authorization reply message, each clearing and/or settlement message, etc.). Table 1 illustrates an exemplary segment of such a log, which may be stored in the data structure 120, for reply (or response) messaging passing through the payment network 106.

TABLE 1

| Entry | Last Four Digits of PAN | Transaction Amt. | Card Acceptor ID | Status |
|---|---|---|---|---|
| 1 | 1234 | $145.67 | 696458148697058 | 00 (Approved) |
| 2 | 2345 | $ 15.83 | 696458148697058 | 00 (Approved) |
| 3 | 3456 | $ 87.46 | 696458148697058 | 05 (Declined, Do Not Honor) |
| 4 | 2345 | $324.29 | 696666666697066 | 00 (Approved) |
| ... | ... | ... | ... | ... |

As shown in Table 1, the exemplary log includes the primary account number (PAN) for the payment account of the user 112 (i.e., the last four digits thereof), the transaction amount for each transaction passed through the payment network 106, and the status of the transaction (e.g., as included at DE 39 of an ISO 8583 authorization reply associated with the transaction, etc.), etc. Other transaction data may be included in the log for each transaction such as, for example, a processing code (or cardholder transaction type code) (e.g., 00—Purchase; 20—Refund; 28—Payment; etc.), a temporal indicator (e.g., a time/date of the transaction, etc.), etc. (e.g., depending on a type of the transaction, etc.). It should be appreciated that the data included in Table 1 is merely exemplary in nature and that alternative and/or additional data related to the user 112, the payment account of the user 112 (or the payment account of the business/merchant 113 where the source of the funds being transferred is the business), the message gateway 108, the banking institutions 102 and/or 104, the recipient user of the fund transfer, the underlying transaction, etc., will often be included in the log stored in the data structure 120.

In at least one embodiment, the log stored in the data structure 120 may be populated only with authorization reply messages, which include statuses of the transactions. In other embodiments, the payment network 106 may be configured to filter the authorization messages (e.g., the authorization request messages, the authorization reply messages, etc.) for messages related to the web service host 110 (and/or its related web services such as, for example, Mastercard Send® services, etc.), whereby the log (which is published herein via the feed 122) is limited to authorization messages related to the web service host 110. This filtering may be based on, for example, a card acceptor ID included in the authorization message, or other data indicative of the web service host 110, etc. As such, a log may be maintained (by the payment network 106 (or part thereof) or otherwise) in the data structure 120 which is specific to the operations described herein (e.g., separate from other, different logs relied upon otherwise by the payment network 106, etc.).

While the above exemplary embodiment is described with respect to a P2P transaction, it should be appreciated that the description is also applicable to P2M transactions, B2C transactions, and purchase transactions (or fund transfers) in general. For instance, regarding a P2M transaction, the user 112 may desire to make a payment transaction to the merchant, either directly (whereby the merchant may be directly associated with the transaction originator 111) or through his/her mobile device 112 (and the virtual wallet application 116 installed thereon) at a POS terminal associated with the merchant, or by scanning a code (e.g., a QR code, etc.) associated with a product at the merchant or entering a USSD code or IVR code into a corresponding application. In the latter cases, the transaction originator 111 may provide the application that initiates the payment transaction. Regardless, though, in each of the scenarios for the P2M transaction, the transaction originator 111 initiates the requested payment transaction and communicates with the web service host 110, whereby the web service host 110 transmits a transaction request to the message gateway 108 (on behalf of the banking institution 102 associated with the transaction originator 111 and using the banking institution's credentials). And, the message gateway 108 then forwards the transaction request to the interface processor 118 (associated with the banking institution 102), whereby the interface processor 118 compiles an authorization request for the transaction (and transmits the authorization request to the payment network 106 as generally described above). The banking institution 104 (associated with the recipient of the payment transaction funds) then authorizes the payment to the recipient's account/card.

And, regarding a B2C transaction, a business or merchant (e.g., business/merchant 113, etc.) may desire to transfer funds to a consumer (e.g., an insurance claim payment, etc.). In so doing, the transaction originator 111 (on behalf of or in association with the business or merchant) may communicate a payment transaction with the web service host 110 (based on an account number on record for the consumer, etc.), whereby the web service host 110 transmits a transaction request to the message gateway 108 (on behalf of the banking institution 102 associated with the transaction originator 111 and using the banking institution's credentials). And, the message gateway 108 then forwards the transaction request to the interface processor 118 (associated with the banking institution 102), whereby the interface processor 118 compiles an authorization request for the transaction (and transmits the authorization request to the payment network 106 as generally described above). In this example, a mobile device is not required nor is a virtual wallet application.

Figure 2:
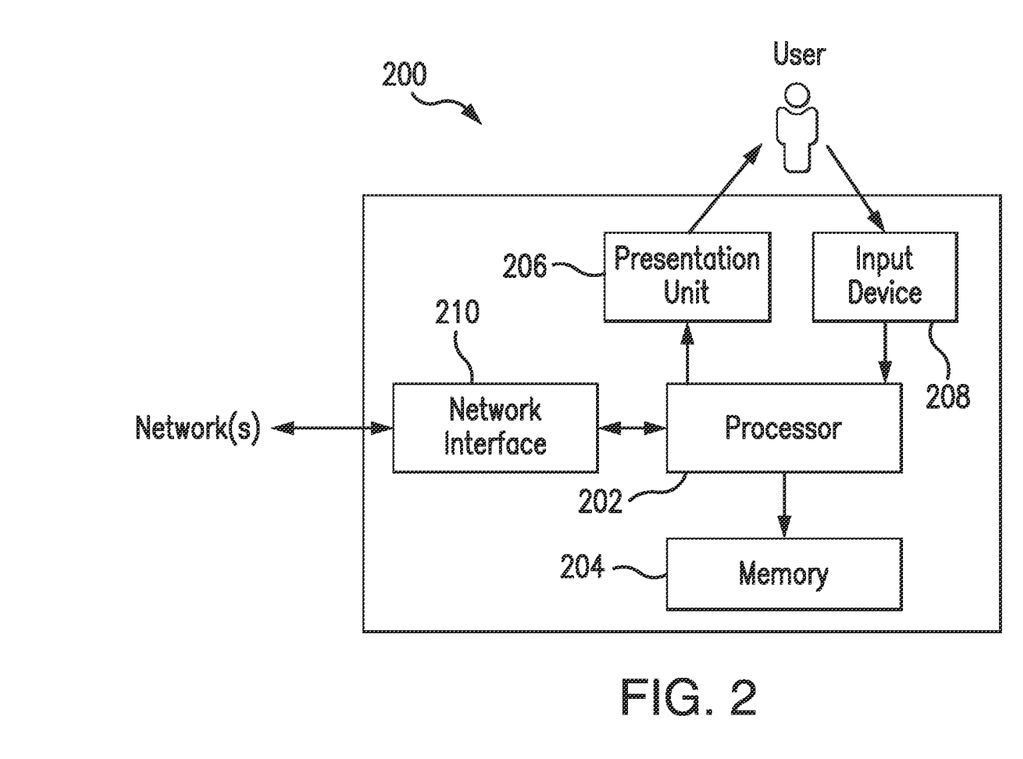
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, POS terminals, laptops, tablets, smartphones, PDAs, etc. In addition, the computing device 200 may include a single computing device, or it may include multiple computing devices located in close proximity or distributed over a geographic region as a network of computing devices, so long as the computing devices are specifically configured to function as described herein. In particular, in the exemplary system 100 of FIG. 1, each of the first and second banking institutions 102 and 104, the payment network 106, the message gateway 108, the web service host 110, and the transaction originator 111 should be understood as being implemented in (and/or otherwise including) one or more computing devices consistent with the computing device 200. In addition, the mobile device 114 associated with the user 112 is also consistent with computing device 200. That said, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data (e.g., payment account numbers, acquirer IDs, issuer IDs, transaction statuses, etc.), and/or other types of data (and/or data structures) suitable for use as described herein. Furthermore, in various embodiments, executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 that is performing one or more of the various operations herein (e.g., one or more of the operations of method 300, etc.) and, upon performance of such instructions by the processor 202, may transform the computing device 200 into a special purpose computing device. It should be appreciated that the memory 204 may include a variety of different memories, each implemented in one or more of the functions or processes described herein.

In addition in the exemplary embodiment, the computing device 200 includes a presentation unit 206 that is coupled to (and is in communication with) the processor 202 (however, it should be appreciated that the computing device 200 could include output devices other than the presentation unit 206, etc.). The presentation unit 206 outputs information (e.g., a status of a transaction, etc.), either visually or audibly to a user of the computing device 200, for example, to the transaction originator 111 in the system, the user 112 in the system 100, to users associated with other parts of the system 100, etc. And, various interfaces (e.g., as defined by applications, webpages, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices. With that said, in some embodiments, the computing device 200 may include an output device (associated with the presentation unit 206 or otherwise) configured to output data to one or more databases, etc., where desired data may then be displayed to a user based on the data in the one or more databases.

The computing device 200 also includes an input device 208 that receives inputs from the user (i.e., user inputs) of the computing device 200 or from one or more other computing devices, where the inputs may include, for example, requests for a push transaction, merchant and/or user payment account identifiers, etc. The input device 208 is coupled to (and is in communication with) the processor 202 and may include, for example, a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device (e.g., the communication device 114, etc.), may behave as both the presentation unit 206 and the input device 208.

In addition, the illustrated computing device 200 also includes a network interface 210 coupled to (and in communication with) the processor 202 and the memory 204. The network interface 210 may include, without limitation, a wired network adapter, a wireless network adapter (e.g., a near field communication (NFC) adapter, a ZigBee adapter, an RFID adapter, a Bluetooth adapter, etc.), a mobile network adapter, or other device capable of communicating to/with one or more different networks, including one or more of the networks in FIG. 1. Further, in some exemplary embodiments, the computing device 200 may include the processor 202 and one or more network interfaces (including the network interface 210) incorporated into or with the processor 202.

Referring again to FIG. 1, in the flow of the example P2P transaction request described above (and similarly for the P2M transaction and the B2C transaction noted above, and for purchase transactions in general), the flow of the transaction may be, from time to time, interrupted or disrupted (e.g., at B4, etc.), whereby a status of the transaction is not available and/or received at the web service host 110 from the message gateway 108. For example, a network issue at/between the web service host 110 and/or the message gateway 108 may exist, thereby preventing messaging therebetween. In such circumstances, the web service host 110 is configured with one or more temporal rules, whereby a status is still returned to the transaction originator 111 regardless of whether it is actually received from the message gateway 108. For example, the web service host 110 may be configured to return an unknown or indeterminate status to the transaction originator 111 when no authorization reply is received from the message gateway 108 within a defined interval (e.g., within ten seconds of transmitting the transaction request, within twenty seconds, within thirty seconds, within two minutes, or some other time interval, etc. as determined by a timer at the web service host 110). With that said, it should be appreciated that, in some embodiments, when the web service host 110 does not receive a status of a transaction from the message gateway 108, the web service host 110 may be configured to check existing/available authorization data (e.g., as stored at the web service host 110 based on the feed 122 of such data from the payment network 106 (where such data is not received from the message gateway 108), etc.) prior to returning the unknown or indeterminate status (whereby if the authorization data is available, the web service host 110 may return the correct status of the transaction originator 111, instead of the unknown or indeterminate status).

Unfortunately, when the unknown or indeterminate status is returned to the transaction originator 111, as suggested, such unknown or indeterminate status is not helpful to the transaction originator 111 in determining whether the transaction is approved by the banking institution 104 (as associated with the recipient of the funds), whereby the banking institution 104 may understand the transaction to be approved and accepted, but neither the web service host 110 nor the transaction originator 111 are actually notified of the approved status of the transaction. Nor is such status helpful to the transaction originator 111 in determining whether the transaction is declined by the banking institution 104, whereby the transaction originator 111 may continue to wait for a transaction status when the transaction has already been declined. This condition may result in transaction delays, or even payment for products/services or of obligations, but without delivery of the products/services or relief of the obligations, etc.

Uniquely herein, in connection therewith, the web service host 110 is configured, by executable instructions, to determine, in real time (or near real time) or at one or more intervals (e.g., every ten seconds, thirty seconds, six seconds, etc.), whether the transaction (or other transactions) includes an unknown or indeterminate status (via the feed 122 of authorization data received by the web service host 110 from the payment network 106). Alternatively, or additionally, the web service host 110 may be configured to add the transaction to a list when the message gateway 108 returns an unknown or indeterminate status, or doesn't respond at all. For example, when the status of the transaction is unknown or indeterminate, the web service host 110 may be configured to append the transaction to a transaction unknown list in memory (e.g., the memory 204, etc.) associated therewith. The list may include one or more details about the transaction, such as shown, for example, in Table 2 (e.g., the PAN or segment thereof, a transaction amount, a processing code, a payment transaction type code, etc.).

TABLE 2

| Last Four Digits of PAN | Transaction Amt. | Processing Code | Type Code | Status |
|---|---|---|---|---|
| 3456 | $ 87.46 | 28 | C52 | Unknown |
| 2345 | $324.29 | 00 | C07 | Unknown |
| ... | ... | ... | ... | ... |

When a transaction is included in the list (and for each such transaction), the web service host 110 is further configured to receive (e.g., consume, etc.) the authorization messages published by the payment network 106 as part of the real time or near real time authorization message feed 122. In connection therewith, the web service host 110 is configured to read the authorization message feed 122 from the payment network 106 to identify a matching transaction from the feed 122 to each transaction in the list (e.g., to search for matching transactions based on one or more details of the transaction such as included in Table 2, etc.) and determine a status of each transaction. When a transaction in the list is identified, the web service host 110 is configured to transmit the status (e.g., as part of a status message, etc.) to the transaction originator 111 (and, in some embodiments, to then also transmit the status to the first banking institution 102). The transaction originator 111 may then notify the user 112 (or other individual or business entity (such as business/merchant 113) that initiated the payment transaction) of the status (e.g., via an API, via other communication means, etc.). The status notification may relate to whether the transaction is complete or not, and/or it may include one or more details of the transaction. In addition, such matching by the web service host 110 may be done prior to returning an indeterminate or unknown status to the transaction originator 111. In this manner, any lost connections between the web service host 110 and the message gateway 108 may be addressed through use of the real time or near real time authorization message feed 122 received by the web service host 110 from the payment network 106 (independent of the connection between the web service host 110 and the message gateway 108). However, in general, the authorization message feed 122 is only used by the web service host 110 to determine the status of the transaction when the status is not available from the message gateway 108 (for one or more reasons such as, for example, an interruption in communication between the web service host 110 and the message gateway 108).

Figure 3:
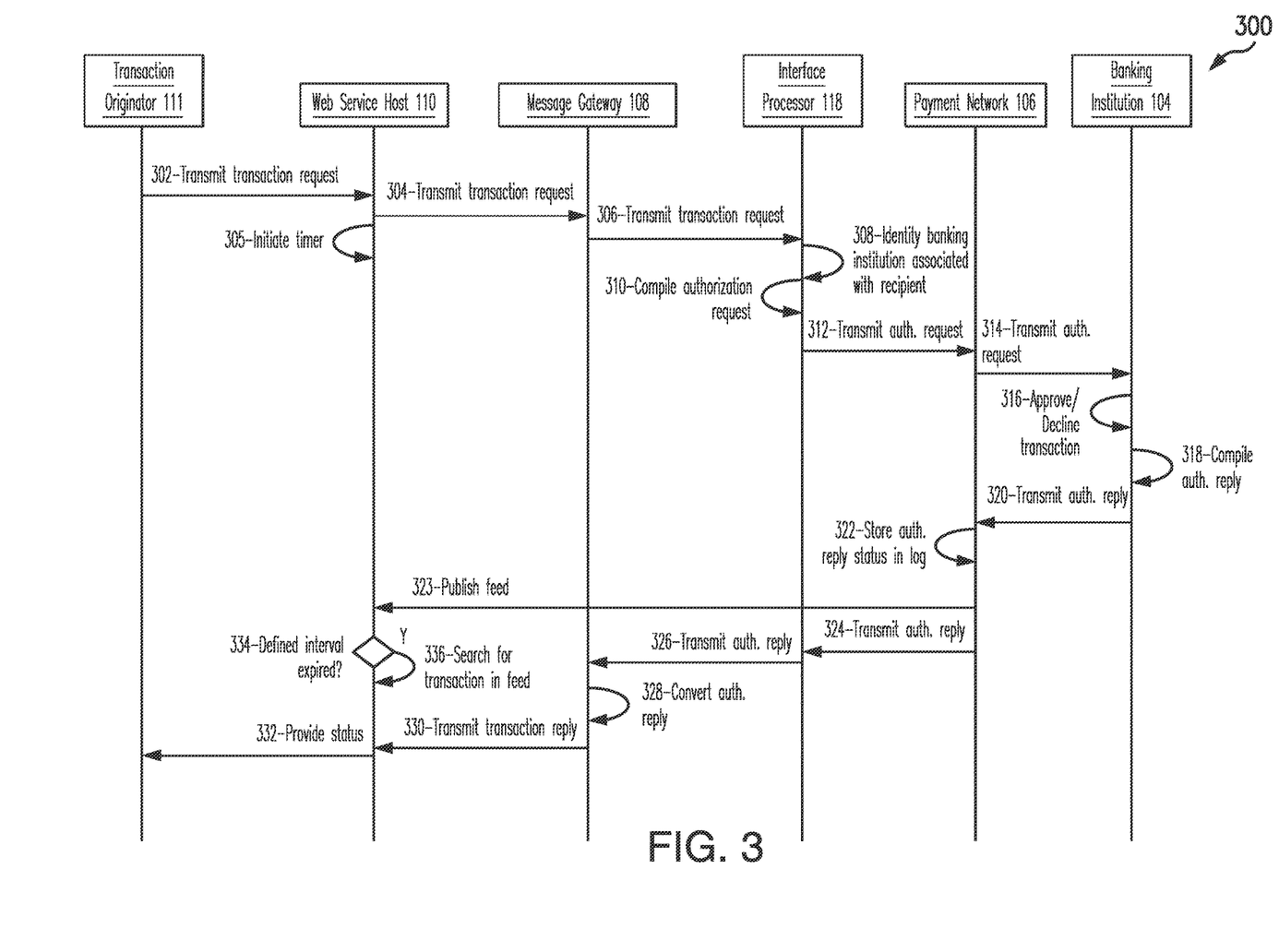
FIG. 3 is an exemplary method that may be implemented in the system of FIG. 1 for use in facilitating a network transaction, when communication with a transaction originator involved in the transaction is interrupted, through delivery of a transaction status through an alternate route to the transaction originator.

FIG. 3 illustrates an exemplary method 300 for use in facilitating a network transaction, for example, when communications in a conventional flow of the transaction are interrupted, etc. The exemplary method 300 is described in general with reference to the payment network 106 and the web service host 110 described above, and to other aspects of the system 100, and also with reference to the computing device 200. However, it should be understood that the method 300 is not limited to the system 100 or the computing device 200. And, likewise, the systems and the computing devices herein should not be understood to be limited to the exemplary method 300.

Initially in the method 300, in a P2M transaction or a P2P transaction, for example, the user 112 may access the virtual wallet application 116 in the mobile device 114 and opt to make a payment to a merchant or to another user, etc. (broadly, to a recipient) (where a virtual wallet provider associated with the virtual wallet application 116 may operate as the transaction originator 111). Or, the user 112 may access a web browser via a computing device (independent of the mobile device 114 and the virtual wallet application 116) and similarly opt to make a payment to a merchant or to another user (where a server associated with the web browser, for example, may operate as (or in association with) the transaction originator 111). Alternatively, in a B2C transaction, a business (such as business/merchant 113) may directly interact with the transaction originator 111 in order to initiate a payment transaction to a consumer (e.g., a user or another business, etc.). Then, in each of the above scenarios, the transaction originator 111 receives details of the desired payment transaction (from the sender of funds in the transaction) and transmits, at 302, a transaction request (including the transaction details (e.g., a transaction amount, an identifier associated with the recipient's account, an identifier associated with the sender's account, a time/date of the transaction, etc.)) to the web service host 110. In this exemplary embodiment, the transaction request is transmitted by the transaction originator 111 via an application programming interface (API) request to the web service host 110 (e.g., in JSON or XML format, etc.) (which may be different than and/or distinct from the ISO 8583 standard utilized for communications between the interface processor 118, the payment network 106, and the second banking institution 104).

Upon receipt of the transaction request, the web service host 110 transmits, at 304, the transaction request to the message gateway 108 (e.g., as a web service call, etc.). Further, the web service host 110 also initiates, at 305, a timer for the transaction (when the transaction request is transmitted). In turn, the message gateway 108 transmits, at 306, the transaction request to the interface processor 118 (e.g., as a web service call, etc.) (as associated with the financial institution of the sender of the funds (e.g., financial institution 102, etc.)), and identifies, at 308, the second banking institution 104 (e.g., based on the recipients PAN as included in the transaction request, etc.) as associated with the account of the recipient to which the funds are to be paid/transferred. The interface processor 118 then also compiles, at 310, an authorization request for the transaction. In this embodiment, the authorization request is consistent with the ISO 8583 standard (i.e., is an ISO 8583 message having a message type of 0100 or 0200, etc.), which includes various details of the payment transaction (e.g., the sender's PAN, the recipient's PAN, an indication of the recipient's banking institution 104 (as identified by the interface processor 118), an amount of the payment transaction, a time/date of the payment transaction, etc.).

Then, the interface processor 118 transmits the authorization request to the payment network 106, at 312. And, the payment network 106 transmits, at 314, the authorization request to the second banking institution 104 (associated with the recipient's payment account) (or to in interface processor associated with the second banking institution 104). In connection therewith, although not shown in FIG. 3, in some embodiments the payment network 106 may create an entry in the log in the data structure 120 for the transaction and include the transaction data, or part thereof, from the authorization request, in the entry.

Next in the method 300, the second banking institution 104 decides, at 316, whether to approve or decline the transaction. The decision may be based on the transaction data included in the authorization request, a standing of the recipient's account, etc. Regardless of whether the transaction is approved or declined, the second banking institution 104 compiles, at 318, an authorization reply for the transaction. In this embodiment, like the authorization request, the authorization reply is consistent with the ISO 8583 standard (i.e., the authorization reply includes an ISO 8583 message). In addition to transaction data consistent with the authorization request, the authorization reply further includes a status of the transaction, which is either an approve status or a decline status (e.g., in DE 39, etc.). After compiling the authorization reply, the second banking institution 104 (or the interface processor associated therewith) transmits, at 320, the authorization reply to the payment network 106.

At 322, the payment network 106 stores the authorization reply, or at least the status of the authorization reply, in the log in the data structure 120 (see, e.g., Table 1 above, etc.). The authorization reply (or part thereof) may be stored in an entry already created based on the authorization request, or the payment network 106 may create a new entry for the transaction in the log based on the authorization reply. In addition, or alternatively, the payment network 106 may publish, at 323, the data associated with the authorization reply (along with data for other authorization replies) to the web service host 110, for example, as part of an authorization message feed 122 of real time or near real time authorization information for transactions processed by the payment network 106 (thereby involving data not received from the message gateway 108) (and whereby the web service host 110 may be able to search for and identify the example transaction from the feed 122, as desired, and also identify the status of the transaction as needed (and as described more below)). Thereafter, or at the same time, the payment network 106 transmits, at 324, the authorization reply to the interface processor 118. Upon receipt, the interface processor 118 transmits, at 326, the authorization reply to the message gateway 108.

In response, the message gateway 108 converts, at 328, the authorization reply into a transaction reply consistent with a communication protocol between the web service host 110 and the message gateway 108 (which may be different than and/or distinct from the ISO 8583 standard utilized for communications between the interface processor 118, the payment network 106, and the second banking institution 104). Then, at 330, the message gateway 108 transmits the transaction reply to the web service host 110. When the transaction reply is received, the web service host 110 transmits, at 332, the transaction reply, or at least the status of the transaction included in the reply, to the transaction originator 111, thereby notifying the transaction originator 111 that the transaction is either approved or declined.

Also in the method 300, after transmitting the transaction request, but prior to receiving the transaction reply from the message gateway 108, the web service host 110 determines, at 334, whether a defined interval has expired since the transaction request was transmitted (i.e., based on the initiated timer). The defined interval may include, without limitation, an interval of ten seconds, twenty second, twenty-five second, forty second, 1 minute, 2 minutes, or another interval or any discrete interval included in the specific intervals listed, etc. In general, the defined interval is selected to balance sufficient time to authorize the transaction with convenience of the entity initiating the payment transaction and/or recipient of the payment transaction. When a time is within the defined interval, and the transaction reply has not yet been received by the web service host 110, the web service host 110 continues to wait for the transaction reply.

Further, in response to a determination that the defined interval has expired (and the transaction reply has not yet been received by the web service host 110), the web service host 110 searches in the authorization message feed 122 of real time or near real time authorization information for the transaction, at 336. When a match is found, the web service host 110 can then determine a status of the transaction from the match. However, when no match is found, the web service host 110 determines that the status of the transaction is unknown or indeterminate. Upon determination of the appropriate status, the web services host 110 then provides the status (as a status message) to the transaction originator 111, at 332 as described above. In the case of an unknown or indeterminate status, upon receipt, the transaction originator 111 may make a read call to the API (associated with the web service host 110) to check if the transaction details have been further updated (e.g., a request to provide an updated status, etc.), via the authorization information feed 122. The web service host 110 may then again access the authorization data in the authorization message feed 122 and search for the transaction to determine if the status of the transaction is available.

In various embodiments, in connection with determining, at 334, whether a defined interval has expired since the transaction request was transmitted, when a time is still within the defined interval (i.e., the defined interval has not yet expired) and the transaction reply has not yet been received by the web service host 110, the web service host 110 may search in the authorization message feed 122 of real time or near real time authorization information for the transaction (as at 336) instead of waiting for the transaction reply (or waiting for the defined interval to expire). Then, when a match is found, the web service host 110 can determine a status of the transaction from the match and transmit the status to the transaction originator 111. However, in this example, when no match is found, the web service host 110 may then wait for the transaction reply.

It should be appreciated that the present disclosure may be applicable to both push transactions and pull transactions. In connection therewith, payments and payment transactions, as described herein, generally include payment pushes of money to accounts. Such transactions differ from traditional purchase transactions in that purchase transactions involve acquirers pulling money from consumer funding accounts and moves the money to merchant or recipient accounts. With push payments, however, the funds are pushed directly to issuers (e.g., issuing banking institutions, etc.) of the recipients' (e.g., individuals, businesses, etc.) accounts. Funding for the push payments are pulled from the transaction originators' accounts at the acquirers. In the case of P2P transactions, the funding of the payments may be pulled form bank accounts of the consumers using DDA, purchase transactions on card accounts, or by other means.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, by a host computing device, from a transaction originator, a request for a transaction between a sending party and a receiving party, the transaction directing funds from an account associated with the sending party to a payment account associated with the receiving party; (b) transmitting, from the host computing device, a transaction request to an interface processor via a message gateway, thereby enabling the interface processor to generate and transmit an authorization request for the transaction to a banking institution associated with the sending party's account via a payment network; (c) when a defined interval expires without a transaction reply to the transaction request, determining, by the host computing device, a status of the transaction from authorization data received from the payment network but not received from the message gateway; and (d) providing, by the host computing device, the status of the transaction to the transaction originator, as determined from said authorization data, thereby bypassing the message gateway to determine the status of the transaction and limiting an unknown status for the transaction being provided to the transaction originator based on a disruption in communication between the message gateway and the host computing device.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112 (f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in facilitating a network transaction, the method comprising:
   receiving, by a host computing device, from a transaction originator, a request for a transaction between a sending party and a receiving party, the transaction directing funds from an account associated with the sending party to a payment account associated with the receiving party;
   transmitting, from the host computing device, a transaction request to an interface processor, through a message gateway;
   generating, by the interface processor, and transmitting, through a payment network, an authorization request for the transaction to a banking institution associated with the sending party's account;
   initiating a timer for a defined interval;
   receiving, by the host computing device, from the payment network, independent of the message gateway and the interface processor, an authorization message feed, which includes authorization data for a plurality of transactions through the payment network, the plurality of transactions including said transaction;
   determining, by the host computing device, that the initiated timer has expired the defined interval without receiving a transaction reply to the transaction request via the message gateway;
   in response to determining the defined interval is expired without receiving the transaction reply via the message gateway:
      determining, by the host computing device, a status of the transaction from the authorization message feed received from the payment network, independent of the message gateway; and
      providing, by the host computing device, the status of the transaction to the transaction originator, as determined from said authorization message feed received from the payment network, which bypasses the message gateway in determining the status of the transaction and limits an unknown status for the transaction being provided to the transaction originator based on a disruption in communication between the message gateway and the host computing device.

2. The computer-implemented method of claim 1, wherein the transaction includes a push transaction to the receiving party; and
   wherein the transaction request includes an identifier associated with the receiving party, thereby allowing the interface processor to identify the banking institution associated with the receiving party's payment account.

3. The computer-implemented method of claim 2, wherein the identifier includes a primary account number for the receiving party's payment account.

4. The computer-implemented method of claim 1, wherein the authorization request includes a message consistent with an ISO 8583 format; and
   wherein the transaction request includes a message with a format distinct and different from the ISO 8583 format.

5. The computer-implemented method of claim 1, wherein the defined interval is less than about one minute.

6. The computer-implemented method of claim 1, wherein determining the status of the transaction includes:
   searching, by the host computing device, in the authorization message feed for the authorization data for the transaction, based on at least one of a transaction amount, at least a segment of an account number for the receiving party's payment account, a transaction code, and/or a transaction date; and
   when the transaction is identified in the authorization data, retrieving the status of the transaction from the authorization data.

7. The computer-implemented method of claim 1, further comprising, when the status of the transaction is unknown or indeterminate, receiving, at the host computing device, from the transaction originator, a request to provide an updated status for the transaction.

8. The computer-implemented method of claim 1, wherein the sending party includes an individual; and
   wherein receiving the request for the transaction includes receiving, by the host computing device, the request for the transaction from a virtual wallet provider associated with a virtual wallet account of the individual.

9. The computer-implemented method of claim 1, wherein the sending party is a business entity.

10. The computer-implemented method of claim 1, wherein the transactions represented by the authorization data are limited to transactions relating to transaction requests transmitted from the host computing device.

11. A system for facilitating a network transaction between a sending party and a receiving party, the system comprising:
   a host computing device configured to:
      receive, from a transaction originator, a request for a transaction between a sending party and a receiving party, the transaction directing funds from an account associated with the sending party to an account associated with the receiving party;
      transmit a transaction request to an interface processor, via a message gateway, thereby enabling the interface processor to generate and transmit an authorization request for the transaction to a banking institution associated with the sending party's account via a payment network;
      initiate a timer for a defined interval;
      receive, from the payment network, independent of the message gateway and the interface processor, an authorization message feed, which includes authorization data for a plurality of transactions through the payment network, but not through the message gateway or the interface processor, the plurality of transactions including said transaction;
      determine that the initiated timer has expired the defined interval without receiving a transaction reply to the transaction request via the message gateway;
      in response to determining the defined interval is expired without receiving the transaction reply via the message gateway, determine a status of the transaction from the authorization message feed received from the payment network, independent of the message gateway, thereby bypassing the message gateway in determining the status of the transaction and limiting an unknown status for the transaction being provided to the transaction originator; and
      provide the status of the transaction to the transaction originator.

12. The system of claim 11, wherein the host computing device is further configured, in connection with determining the status of the transaction from the authorization data received from the payment network, to:
   search in the authorization message feed for the authorization data for the transaction, based on at least one of a transaction amount, at least a segment of an account number for the receiving party's account, a transaction code, and/or a transaction date; and
   when the transaction is identified in the authorization data, retrieve the status of the transaction from the authorization data.

13. The system of claim 12, wherein the transaction request includes an identifier associated with the receiving party, thereby allowing the interface processor to identify the banking institution associated with the receiving party's account.

14. The system of claim 12, wherein the authorization request includes a message consistent with an ISO 8583 format; and
   wherein the transaction request includes a message with a format distinct and different from the ISO 8583 format.

15. The system of claim 12, wherein the authorization message feed includes authorization relating to transaction requests transmitted from the host computing device.

16. The system of claim 11, wherein the host computing device is further configured, when the status of the transaction is available from the message gateway, to receive a transaction reply to the transaction request from the message gateway comprising the status of the transaction, without determine the status of the transaction from the authorization data received from the payment network.

17. A non-transitory computer readable storage media comprising executable instructions for facilitating a network transaction between a sending party and a receiving party, which when executed by at least one processor, cause the at least one processor to:
   receive, from a transaction originator, a request for a transaction between a sending party and a receiving party, the transaction directing funds from an account associated with the sending party to an account associated with the receiving party;
   transmit a transaction request to an interface processor, via a message gateway, thereby enabling the interface processor to generate and transmit an authorization request for the transaction to a banking institution associated with the sending party's account via a payment network;
   initiate a timer for a defined interval;
   receive, from the payment network, independent of the message gateway and the interface processor, an authorization message feed, which includes authorization data for a plurality of transactions through the payment network, but not through the message gateway or the interface processor, the plurality of transactions including said transaction;
   determine that the initiated timer has expired the defined interval without receiving a transaction reply to the transaction request via the message gateway;
   in response to determining the defined interval is expired without receiving the transaction reply, determine a status of the transaction from the authorization message feed received from the payment network independent of the message gateway, thereby bypassing the message gateway in determining the status of the transaction and limiting an unknown status for the transaction being provided to the transaction originator; and
   provide the status of the transaction to the transaction originator.

* * * * *